(12) United States Patent
Brucker et al.

(10) Patent No.: US 9,322,738 B2
(45) Date of Patent: Apr. 26, 2016

(54) VACUUM QUALITY MEASUREMENT SYSTEM

(75) Inventors: Gerardo A. Brucker, Longmont, CO (US); Kenneth D. Van Antwerp, Jr., Colorado Springs, CO (US)

(73) Assignee: MKS Instruments, Inc., Andover, MA (US)

( * ) Notice: Subject to any disclaimer, the term of this patent is extended or adjusted under 35 U.S.C. 154(b) by 1024 days.

(21) Appl. No.: 13/508,644

(22) PCT Filed: Nov. 8, 2010

(86) PCT No.: PCT/US2010/055852
§ 371 (c)(1),
(2), (4) Date: May 8, 2012

(87) PCT Pub. No.: WO2011/057201
PCT Pub. Date: May 12, 2011

(65) Prior Publication Data
US 2012/0227465 A1    Sep. 13, 2012

Related U.S. Application Data

(60) Provisional application No. 61/280,825, filed on Nov. 9, 2009, provisional application No. 61/324,992, filed on Apr. 16, 2010.

(51) Int. Cl.
*G01M 3/34* (2006.01)
*G01L 21/02* (2006.01)
(Continued)

(52) U.S. Cl.
CPC ............. *G01M 3/226* (2013.01); *G01M 3/205* (2013.01); *G01M 3/34* (2013.01)

(58) Field of Classification Search
CPC . G01L 21/00; G01L 21/02; G01N 2203/0234
USPC .................. 73/37–49.8, 23.37, 31.04–31.05; 340/626
See application file for complete search history.

(56) References Cited

U.S. PATENT DOCUMENTS 3,762,212 A * 10/1973 Morley et al. ................. 73/40.7
4,747,311 A    5/1988 Hojoh
6,795,178 B1   9/2004 Räsänen et al.
(Continued)

FOREIGN PATENT DOCUMENTS

CN    1689136    10/2005
CN    2757130    2/2006
(Continued)

OTHER PUBLICATIONS

Chiu, et al., "Quadrupole Mass Spectrometric Equipment for Gas Analysis", Analytical Instrumentation, vol. 2, 1990.
(Continued)

*Primary Examiner* — John Fitzgerald
*Assistant Examiner* — Anthony W Megna Fuentes
(74) *Attorney, Agent, or Firm* — Hamilton, Brook, Smith & Reynolds, P.C.

(57) ABSTRACT

A gas analyzer for a vacuum chamber includes processing electronics configured to receive mass spectral data, receive input of total pressure in the vacuum chamber, receive external input from at least one sensor, and employ the mass spectral data, the total pressure in the vacuum chamber, and the external input from the at least one sensor to calculate a vacuum quality index based on at least one criteria of quality.

43 Claims, 5 Drawing Sheets (51) Int. Cl.
*G01M 3/22* (2006.01)
*G01M 3/20* (2006.01)

(56) References Cited

U.S. PATENT DOCUMENTS

| | | | | |
|---|---|---|---|---|
| 6,822,223 | B2 * | 11/2004 | Davis | 250/282 |
| 6,873,672 | B2 * | 3/2005 | Sacedon Adelantado et al. | 376/250 |
| 7,289,863 | B2 * | 10/2007 | Arruda et al. | 700/110 |
| 2003/0160174 | A1 | 8/2003 | Grant et al. | |
| 2006/0123915 | A1 | 6/2006 | Arnold et al. | |
| 2006/0172428 | A1 | 8/2006 | McDermott et al. | |
| 2007/0000309 | A1 * | 1/2007 | Bohm et al. | 73/40.7 |
| 2007/0089835 | A1 | 4/2007 | Koshimizu et al. | |
| 2007/0186622 | A1 * | 8/2007 | Firon et al. | 73/38 |
| 2008/0075834 | A1 | 3/2008 | Ramaswamy et al. | |
| 2009/0026362 | A1 | 1/2009 | Arii et al. | |

FOREIGN PATENT DOCUMENTS

| | | |
|---|---|---|
| CN | 1786704 | 6/2006 |
| EP | 0238297 A2 | 9/1987 |
| JP | S61130485 A | 6/1986 |
| JP | 05-215633 | 8/1993 |
| JP | 2002-005806 | 1/2002 |
| JP | 2007-095825 | 4/2007 |
| JP | 2008523410 A | 7/2008 |
| WO | WO 2004/021394 | 3/2004 |
| WO | WO 2006/065535 A1 | 6/2006 |

OTHER PUBLICATIONS

Watanabe, F., "A Quadrupole Mass Analyzer Combined with a BA-Gauge," Vaclab Inc., SOHO 103, 2-1-2 Matsushiro-Tsukuba, 305-0035, Japan vol. 48, No. 12, 2005, p. 625-630.

International Search Report and the Written Opinion of the International Searching Authority mailed Jun. 21, 2011, International Application No. PCT/US2010/055852, International Filing Date: Nov. 8, 2010.

International Preliminary Report on Patentability mailed May 24, 2012, International Application No. PCT/US2010/055852, International Filing Date: Nov. 8, 2010.

* cited by examiner

VACUUM QUALITY MEASUREMENT SYSTEM

RELATED APPLICATIONS

This application is the U.S. National Stage of International Application No. PCT/US2010/055852, filed Nov. 8, 2010, which designates the U.S., published in English, and claims the benefit of U.S. Provisional Application No. 61/280,825, filed Nov. 9, 2009 and U.S. Provisional Application No. 61/324,992, filed Apr. 16, 2010. The entire teachings of the above applications are incorporated herein by reference.

BACKGROUND OF THE INVENTION

Mass spectrometers have found their way into process applications in both industrial and semiconductor manufacturing and have been successfully applied to solve a variety of issues related to leak detection, gas contamination and gas composition control. The value of the gas composition information provided by mass spectrometry data is well understood; however, mass spectrometers are still perceived as complicated instruments and data interpretation is generally still relegated to "specialists" capable of collecting and interpreting relevant data. The "complexity stigma" associated to mass spectrometers is well-deserved, and it is in some ways the consequence of the high cost of the technology. Most mass spectrometry instrumentation is expensive, and as a result mass spectrometer manufacturers tend to make instruments very flexible so users can operate the device in all conceivable modes.

SUMMARY OF THE INVENTION

Flexibility is generally a desirable feature for mass spectrometry specialists but might result in an overwhelming set of options for those not experienced in the art. Therefore, there is a need for a gas analyzer that minimizes or eliminates the above mentioned complexity.

In one embodiment, a gas analyzer for a vacuum chamber includes processing electronics configured to receive mass spectral data, receive input of total pressure in the vacuum chamber, receive external input from at least one sensor, and employ the mass spectral data, the total pressure in the vacuum chamber, and the external input from the at least one sensor to calculate a vacuum quality index based on at least one criteria of quality.

The at least one criteria of quality can be user-programmable. The gas analyzer can further include a mass spectrometer configured to provide the mass spectral data. The processing electronics can be further configured to determine an identity of at least one chemical species present in the vacuum chamber based on the mass spectral data.

In one embodiment, the processing electronics are further configured to determine fullness level of a cryopump having at least a first stage and a second stage. In a specific embodiment, the at least one sensor includes a temperature sensor of the temperature of the second stage of the cryopump, at least one chemical species present in the vacuum chamber is hydrogen, and the at least one criteria of quality includes the ratio of hydrogen partial pressure to the total pressure in the vacuum chamber.

In another embodiment, the processing electronics are further configured to determine the relative concentrations of at least two chemical species present in the vacuum chamber, and to employ the relative concentrations to calculate the vacuum quality index. In yet another embodiment, the processing electronics are further configured to determine partial pressure of the at least one chemical species present in the vacuum chamber, and to employ the partial pressure to calculate the vacuum quality index. In some embodiments, the processing electronics are further configured to determine the partial pressure of at least two chemical species present in the vacuum chamber, and to employ the partial pressure of the at least two chemical species to calculate the vacuum quality index.

In some embodiments, the gas analyzer can include a display of the partial pressure of the at least one chemical species, a display of minimum and maximum partial pressures of the at least one chemical species, and a digital output of the partial pressure of the at least one chemical species. In certain embodiments, the gas analyzer can include a display of the vacuum quality index, a display of the total pressure in the vacuum chamber, and a display of a scan range of the mass spectral data.

The at least one sensor can include a substrate temperature sensor, a vacuum pump speed sensor, a mass flow monitor, a cryopump temperature sensor, and/or an ion pump current sensor. In some embodiments, the vacuum quality index can control a binary output. In certain embodiments, the gas analyzer can include a digital output of the vacuum quality index, and a digital output of the mass spectral data.

In some embodiments, the processing electronics can be further configured to employ the vacuum quality index to control a process. The process can be baseout of the vacuum chamber and the at least one sensor includes a temperature sensor of the temperature of the vacuum chamber. In this specific embodiment, the at least one criteria of quality includes a ratio of hydrogen to all other chemical species in the vacuum chamber. In another embodiment, the process can be baseout of the vacuum chamber and the at least one sensor includes a position sensor of a gate valve between the vacuum chamber and a vacuum pump for evacuating the vacuum chamber. In this specific embodiment, the at least one criteria of quality includes a ratio of water to all other chemical species in the vacuum chamber.

In another embodiment, a method of analyzing gas in a vacuum chamber includes receiving mass spectral data, receiving input of total pressure in the vacuum chamber, receiving external input from at least one sensor, and employing the mass spectral data, total pressure in the vacuum chamber, and the external input from the at least one sensor to calculate a vacuum quality index based on at least one criteria of quality. The method can further include employing the vacuum quality index to control a process. In some embodiments, controlling the process includes feed forward process control. In some other embodiments, controlling the process includes feed backward process control. In certain embodiments, controlling the process includes tracking the quality of the process in the vacuum chamber over time. In certain other embodiments, controlling the process includes matching the quality of the process in different vacuum chambers. In yet other embodiments, the method can further include employing the vacuum quality index to control flow of at least one gas into the vacuum chamber.

In still another embodiment, a method of analyzing gas in a vacuum chamber includes receiving input of a desired concentration of at least one gas in the vacuum chamber, calculating an expected mass spectrometer scan output for the desired concentration of the at least one gas in the vacuum chamber, receiving mass spectral data, and employing the expected mass spectrometer scan output and the mass spectral data to calculate a vacuum quality index based on at least one criteria of quality. The method can further include employing the vacuum quality index to control a process. The process can include gas flow into the vacuum chamber. The at least one criteria of quality can include correlation between the expected mass spectrometer scan output and the mass spectral data.

In yet another embodiment, a method of analyzing gas in a vacuum chamber includes receiving mass spectral data, receiving input of total pressure in the vacuum chamber, receiving external input from an ion beam current sensor, and employing the mass spectral data, total pressure in the vacuum chamber, and the external input from the ion beam current sensor to calculate a vacuum quality index based on at least one criteria of quality. The method can further include employing the vacuum quality index to control a process. The process can include ion implantation with an ion beam. The at least one criteria of quality can include a compensation due to beam charge state changes caused by charge exchange between ions in the beam and neutral gas species in the vacuum chamber.

In still another embodiment, a gas analysis system for a vacuum chamber includes a mass spectrometer, at least one sensor, and a gas analyzer for a vacuum chamber that includes processing electronics configured to receive mass spectral data, receive input of total pressure in the vacuum chamber, receive external input from at least one sensor, and employ the mass spectral data, the total pressure in the vacuum chamber, and the external input from the at least one sensor to calculate a vacuum quality index based on at least one criteria of quality.

This invention has many advantages, including combining total pressure information, mass spectral data, and external inputs into a single numerical index that can be used to drive outputs such as analog voltage, digital voltage (digital logic), and relay closures.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
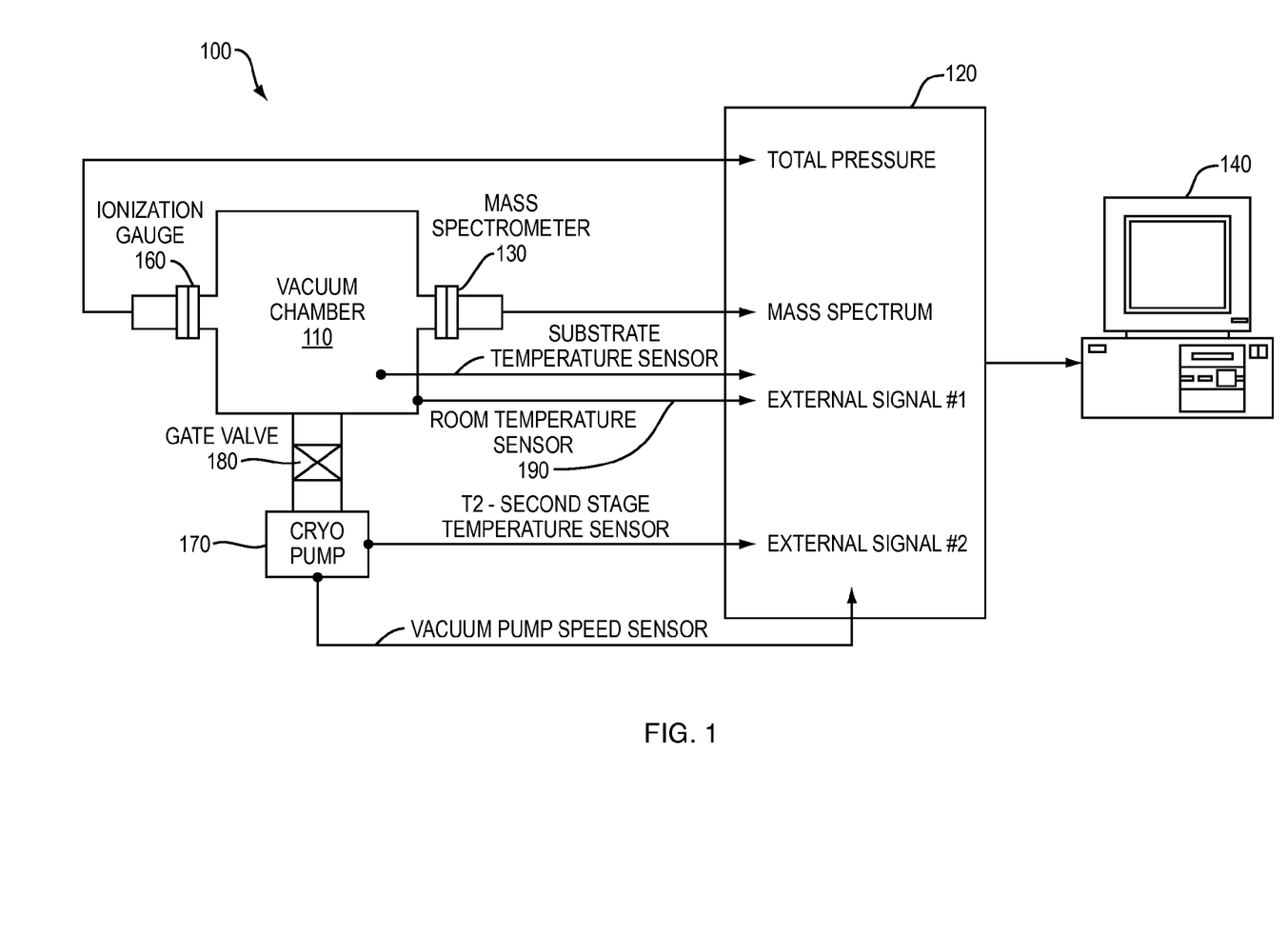
FIG. 1 is a schematic illustration of a gas analyzer of this invention including a personal computer.

In one embodiment, shown in FIG. 1, a gas analyzer 100 for a vacuum chamber 110 includes processing electronics 120 configured to receive mass spectral data, receive input of total pressure in the vacuum chamber 110, receive external input from at least one sensor, and employ the mass spectral data, the total pressure in the vacuum chamber, and the external input from the at least one sensor to calculate a vacuum quality index (VQI) based on at least one criteria of quality.

The combination of total pressure and mass spectral data can be regarded as a signature or pattern which can then be used to (1) track the quality of the vacuum in a chamber over time, (2) do feed forward and feed backward process control and (3) provide a means to improve chamber matching. Alternatively, a scripting engine built into a vacuum quality monitor (VQM) controller can be used to derive VQI's from the two sources of data which can then be linked to specific real time outputs. The scripting engine can be used to derive VQI's based on user-programmable criteria of quality. Vacuum indexes combine data from (1) total pressure measurement, (2) mass spectral data, and (3) external data (i.e., vacuum pump speeds or substrate temperatures) to provide a single number—i.e., a single measurement output—which can be used to drive a real-time output and provide real-time process control. Vacuum quality indexes provide the means to turn complicated gas analysis and mass spectral data into a simple measurement output.

As also shown in FIG. 1, the gas analyzer 100 can further include a mass spectrometer 130 configured to provide the mass spectral data. The mass spectrometer can be a quadrupole mass spectrometer or, preferably, an autoresonant trap mass spectrometer (ART MS). See Comparison of Ion Trap Mass Spectrometer and Quadrupole Mass Spectrometer, *Society of Vacuum Coaters,* $52^{nd}$ Annual Technical Conference Proceedings, Santa Clara, Calif., May 9-14, 2009, pp. 122-129; Autoresonant Trap Mass Spectrometry (ART MS) for remote sensing applications, International Journal of Mass Spectrometry (295) pp. 133-137 (2010); U.S. patent application Ser. No. 12/514,339 of A. V. Ermakov et al., filed Nov. 13, 2007, published as U.S. Publication No. 2010/0084549 A1 on Apr. 8, 2010; International Application No. PCT/US2010/033750 of G. A. Brucker et al., filed May 5, 2010, published as WO 2010/129690.

The processing electronics can be further configured to determine an identity of at least one chemical species present in the vacuum chamber based on the mass spectral data. Advanced data processing is required to derive the identity of the chemical species that contribute to the mass spectrum and to determine their relative concentrations. The data processing can be performed on a PC 140 shown in FIG. 1, or on a dedicated data processor 150 shown in FIG. 2, or in the processing electronics 120. The positions and relative amplitudes of the peaks in the mass spectrum are used to derive the identity of the chemical species present in the vacuum system, and the amplitudes of the peaks are used to determine the concentration of the different species in the system. In the case of the gas analyzer with ART MS technology, the electrostatic ion trap is capable of holding a fixed amount of charge, so the amplitude of the peaks in a mass spectrum does not scale with the pressure in the system. The mass spectrometry data provided by the ART MS can be used to derive ratiometric chemical composition, but in order to derive absolute partial pressures with an ART MS sensor, the native ratiometric compositional analysis provided by the sensor are combined with total pressure information provided by an ionization gauge 160 shown in FIGS. 1-2. The gas analyzer 100 includes a connection for a total pressure input from the ionization gauge 160 (e.g., a MicroIon ATM gauge module) which is used by the gas analyzer 100 to obtain total pressure readings in synchronicity with mass spectral scans, and by the gas analyzer viewer software to derive absolute partial pressure readings.

As described above, the ART MS sensor is an electrostatic ion trap that can only hold a fixed amount of ion charge density (i.e., limited by electrostatic repulsion). Given enough time, the trap will fill with ions. The relative densities of ions accumulated inside the trap scale with the relative densities of the gas species in the vacuum environment weighted by the ionization efficiencies of the different species. For example, for a gas environment consisting of 50% $N_2$ and 50% Ar, given that Ar ionizes 20% more efficiently than Nitrogen, the expectation is that the concentration of ions inside the trap will be 54% Ar/46% $N_2$. The ejection efficiency of the ART MS trap can be manipulated to minimize its mass dependence (i.e., a 1/f scan provides optimal ion ejection independent of mass). Measuring the charge ejected by the trap for each ion provides a close representation of the relative ion charges inside the trap. This is accomplished by integrating the area of the mass peaks for each ion, starting from an ion current vs. time mass spectrum, and then calculating the charge contribution of each peak to the total ejected charge. In the previous example, the peaks corresponding to Ar are expected to contribute 54% of the total ejected charge and the peaks from Nitrogen to contribute the remaining 46%. Once the relative contribution of each peak is calculated, and species corresponding to those peaks are identified, the ionization efficiencies of the chemical species can then be applied to derive the exact ratiometric concentration of each species in the gas environment. ART MS sensors are intrinsically ratiometric devices. In the example above, once the contribution of both gases to the total charge is determined (i.e., mostly 28 and 40 amu peaks for $N_2$ and Ar respectively), the ratio of ionization efficiencies (i.e., 1.2) can be used to determine that both gases are present in a 50% ratio in the vacuum system.

In order to assign the peaks in the spectra to actual chemical species it is necessary to correlate the mass spectra to a library of gases by, for example, a spectral deconvolution procedure. During spectral deconvolution, the total spectrum is assumed to consist of a linear combination of mass spectra from several different gas components selected from a library of gases. The contribution of each species required to match the total spectrum is calculated through a linear regression algorithm, and the resulting coefficients provide the contribution of each component to the total spectrum. Gases with non-zero coefficients are then assumed to be present in the gas system, and the coefficients are used to determine their contribution to different peaks in the spectrum. The spectral deconvolution approach is convenient because it accounts for fragmentation patterns of molecular species.

ART MS sensors can provide native ratiometric information. Calculating absolute partial pressures requires additional information provided by the ionization gauge 160 also present in the system 100 shown in FIGS. 1-2. An ionization gauge works by ionizing the gas molecules the same way that the ART MS sensor does. The contribution of each gas to the ion current of the ionization gauge is equal to the ratio of concentrations, weighted by the ionization efficiencies as in the ART MS trap. In the example above, Ar contributes 54% of the ion current and 54% of the total pressure reading. In order to decompose the total pressure provided by the ionization gauge into the contribution from each of its ions, the total pressure is multiplied by the contribution of each ion to the total charge ejected from the trap. For example, if the ionization gauge reads 1E-6 Torr, then 5.4E-7 Torr corresponds to Ar and 4.6E-7 Torr corresponds to $N_2$. Since the gauge readings are calibrated for nitrogen, the partial pressure of $N_2$ in the system is 4.6E-7. However, since Ar ionizes 20% more efficiently than $N_2$, the partial pressure of Ar in the system is: 5.4E-7 Torr/1.2=4.6E-7 Torr. Therefore, the vacuum system has a 50% mixture of $N_2$ and Ar with equal partial pressures of 4.6E-7 Torr. The actual total pressure in the system is 9.2E-7 Torr and not the 1E-6 Torr reading provided by the ionization gauge.

Figure 3:
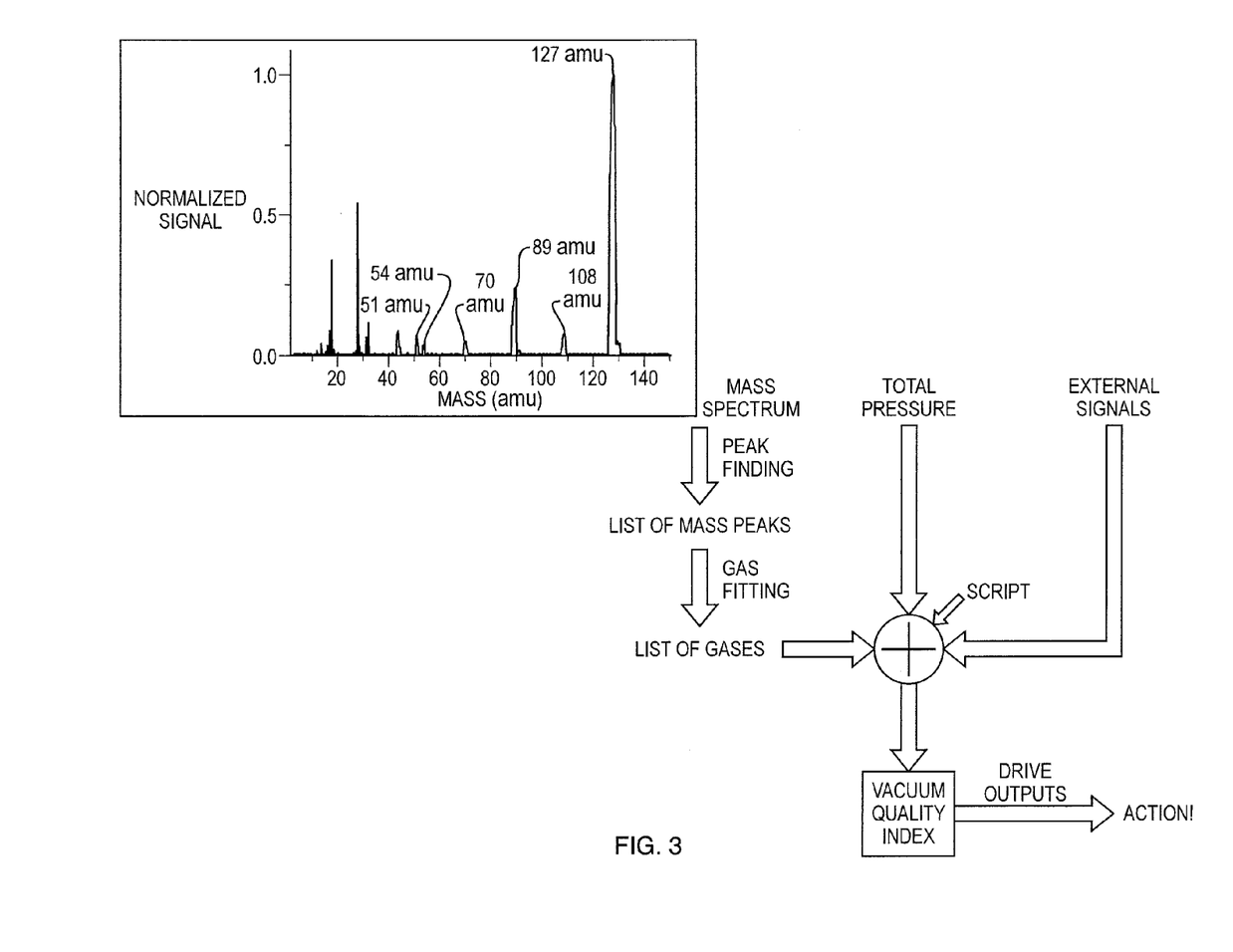
FIG. 3 is a flowchart of vacuum quality monitoring according to this invention.

What most process engineers require from a "gas analyzer" is a device capable of providing the "gas composition" information they need without having to interpret mass spectra or analyze complicated trend plots. A vacuum quality monitor according to this invention provides a measure of vacuum quality in a single number, herein described as an index, obtained by combining total pressure measurement data (internal or external) with gas compositional analysis derived from automated analysis of the mass spectra. That index is derived internally in the instrument and used by the process engineer to assess the "quality of the gas environment" at different steps during a process. The index is calculated based on pre-specified, user-programmable scripts (e.g., Lablua, Rio de Janeiro, Brazil), and can include information from external sources such as thermometers, vacuum (e.g., turbo) pump speed monitors, and mass flow controllers. A flowchart showing an implementation of the vacuum quality index (VQI) is shown in FIG. 3. In the case of an autoresonant trap mass spectrometry (ART MS) device, the vacuum quality index is derived in real-time by analyzing mass spectra as they are generated and using pre-established rules to decide if it is acceptable to proceed.

An advantage of using the vacuum quality index is that better and faster decisions can be made by simultaneously monitoring the total pressure and gas composition in a vacuum system. The vacuum quality information is combined into a single numerical index that can be used to drive simple outputs such as analog voltage, digital voltage and relay closures. In order for this approach to be most efficient, all the sensors could be built into a single sensor package that takes only one port of the vacuum chamber. However, it is also possible to combine data from separate sensors if the user does not wish to give those up.

A vacuum quality index calculation might also include another vacuum quality index from another measurement in the same or another chamber, such as in the case in which the user might need to implement feed-forward or feed-backward process control, or match a process between two vacuum chambers.

As expected, "vacuum quality" means different things for different people, and it might even change its meaning at different stages of a process. A proper vacuum quality monitor should be configured according to the requirements of its user and include means to detect changes in the process that might require a readjustment of the vacuum qualification criteria. Getting a single number out of the device also makes it very easy to set up mission critical SPC (Statistical Process Control) and interlocks capable of shutting down a system if a low quality vacuum is detected.

In order to provide a VQI based on (1) mass spectral data, (2) total pressure and (3) auxiliary signals, it is necessary to know the criteria of quality used by the process engineer to quantify if the quality of the vacuum grants moving forward or stopping a process. This can mean completely different things for users working on different processes. It can also mean different things along a single process that involves multiple steps. The ability of the user to program the calculation with scripts enables flexibility in the VQI definition. Perhaps the best way to illustrate the way in which a vacuum quality monitor operates is to describe below some examples of cases where a vacuum quality index could be used to provide a "go-no go" indication.

Cryopump Fullness Sensor

Figure 2:
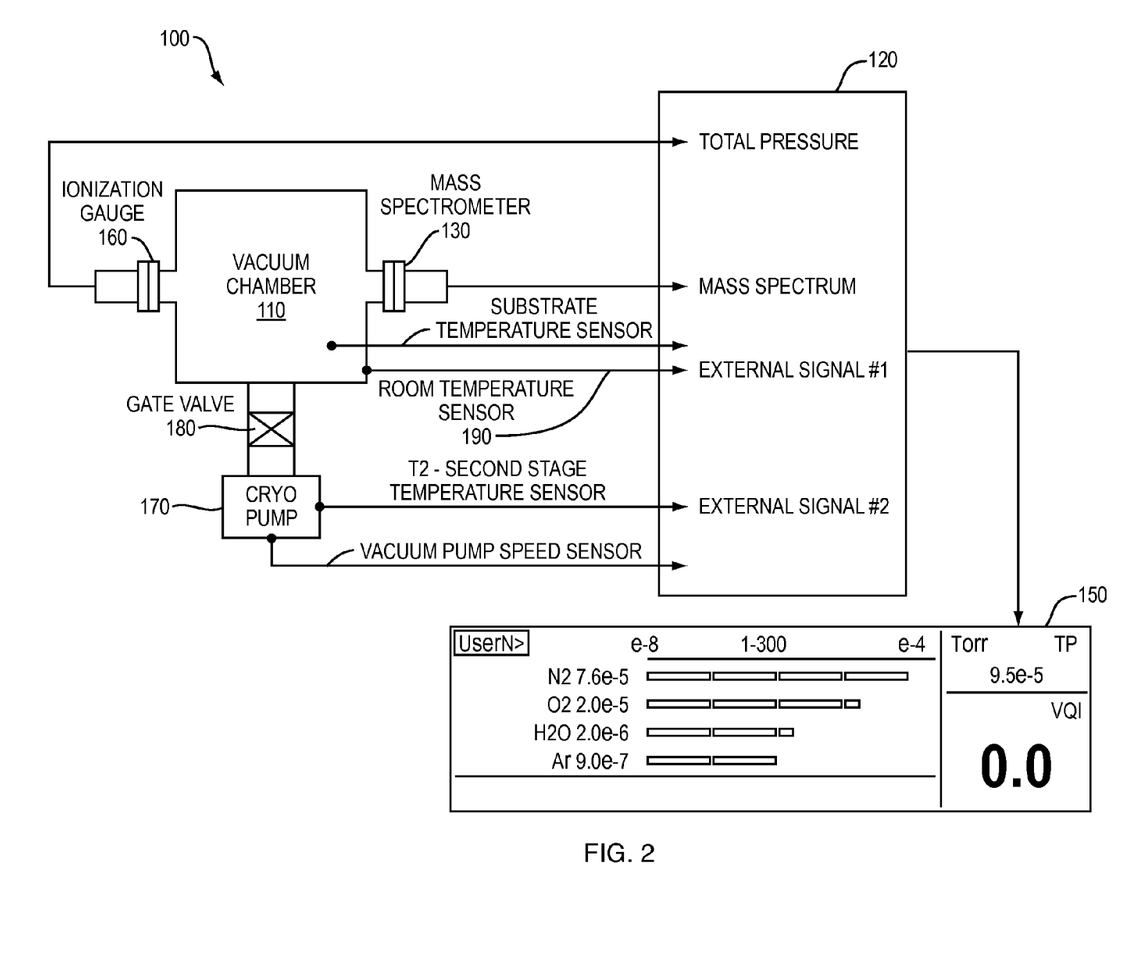
FIG. 2 is a schematic illustration of a gas analyzer of this invention including a dedicated data processor.

FIGS. 1-2 show illustrations of a representative application for a VQM gas analyzer 100, in which a cryopump 170 is used in an ion implanter, or in a UHV vacuum chamber 110 where hydrogen is the main component. As shown in FIGS. 1-2, the total pressure sensor 160 and mass spectrometer 130 are located in the vacuum chamber 110. Alternatively, the total pressure sensor 160 and mass spectrometer 130 could be located above the cryopump 170, below the gate valve 180 to the vacuum chamber 110.

The pumping speed of a cryopump decreases as the amount of hydrogen stored in the cryopump's charcoal layer increases. It is generally recommended that the cryopump be regenerated when the hydrogen levels double in a vacuum chamber as a result of a loss of 50% of the cryopump pumping speed due to $H_2$ capacity reaching its limit. In general, $H_2$ levels start to increase first while other condensable gases are still being pumped, so that using ratios of $H_2$ to total pressure is a good way to monitor fullness of a cryopump. The hydrogen partial pressure in a vacuum chamber is made up of a mixture of Hydrogen being desorbed from the stainless steel walls and Hydrogen flowing back from the full cryopump. The wall levels are affected by temperature. In order to avoid the temperature effects, it is necessary to normalize the $H_2$ levels to temperature when readings of $H_2$ partial pressures are performed. The temperature in the second stage of the cryoump (T2) is also an indicator of high hydrogen partial pressure at the pump. If the temperature rises above 15K, then that also indicates that the cryopump needs to be regenerated.

The process to identify fullness of a cryopump is:

Step 1) Calculate the hydrogen partial pressure ratio relative to total pressure and normalize to room temperature (assuming a linear response). If the partial pressure level is twice what is expected, then regenerate the cryopump. The criteria of quality can be the ratio of $H_2$ to total pressure. If the Hydrogen ratio is too high then set VQI>1. If VQI is <1 then no regeneration is needed.

Step 2) If the T2 temperature, shown in FIGS. 1-2, rises above 15K then set VQI≥1 and start a regeneration of the cryopump.

The input signals, shown in FIGS. 1-2, are:
1. Total pressure (TP)
2. Mass spec—$H_2$ partial pressure (PPH2)
3. Ext Signal#1: Ext Room Temp (T) for $H_2$ level normalization
4. Ext Signal #2: T2 temp—from cryopump to decide whether the cryopump is healthy.

It can be assumed that a healthy system has a maximum of 90% hydrogen in it, so that the partial pressure of $H_2$ to the total pressure is 0.9 in a fresh system. As the partial pressure of $H_2$ increases and doubles, it is assumed that the system goes to 95% hydrogen. It is also assumed that the ratio of $H_2$ to TP scales linearly with absolute temperature. The VQI is:

$$VQI = [(PPH2/TP)*(298/T)]/0.95 - 0.947)*18.87 \quad (1)$$

When the pump is healthy, i.e., 90% $H_2$, and assuming a room temperature T of 298K, then the resulting VQI=0.

When the pump requires regeneration, with a room temperature still at 298K, then $H_2$ is at 95% and the resulting VQI=1.

Base Pressure Conditions (Baseout)

Baseout evacuation of a vacuum chamber is common to all high vacuum (HV $10^{-3}$-$10^{-9}$ Torr) systems. The idea during baseout is to wait for the vacuum chamber to pump down and make sure it reaches an acceptable base pressure with remaining chemical species that are acceptable for further processing.

It is not unusual for semiconductor processes to wait for the total pressure in the chamber to drop below a target high vacuum level to trigger the right moment to remove a process wafer and introduce a new one. Such a need is not unique to the semiconductor industry; magnetic media manufacturing tools also wait for the pressure to drop below target levels before stepping to the next chamber. The present methodology requires waiting for all gas components to be evacuated from the chamber before a process can start. This is potentially an inefficient use of time since most often the components that are most abundant, and take the longest time to pump out, are not harmful to the process. It would be much more efficient to only keep track of the harmful components and wait just for them to drop below harmful levels. This can be done automatically with a mass spectrometer combined with proper data analysis capabilities, and a scripting mechanism that calculates an index that tracks the total concentration of harmful components. One possible approach to defining a vacuum quality index in this case is to determine empirically the levels at which individual gas components known to show up in the chamber become harmful to the process and then define a script that looks for any of those components to exceed their known harmful threshold. The harmful components (e.g., hydrocarbons) could be defined as including any mass peaks at 45 atomic mass units (amu) or larger masses, with no chemical identification of the specific chemical species corresponding to specific peaks being required. The vacuum quality index is calculated by comparing the levels of the harmful components against their harmful thresholds, and adding up all the positive deviations. Gases below the harmful threshold are not included in the calculation, unless they contribute additively with other components. The vacuum quality index can be the sum of all the positive deviations above threshold for all gases. A wafer is ready to be replaced as soon as the vacuum quality index is zero. When the vacuum quality index is zero, the user is assured that all harmful components are below the damage threshold. The user does not need to look at the spectrum, but rather simply wait for the vacuum quality index to go to zero. Notice that even though it is possible to perform this calculation with any mass spectrometer, provided automated data analysis is available, ART MS is the only available technology that will enable the measurement of the VQI in the 0.5 second time that a disc coating chamber is at base pressure.

Another example of a VQI for baseout, using a criteria of quality based on the ratio of water to air is:

$$VQI = 0.625 * H_2O/Air + 0.5 (\text{If Total Pressure} < 1E-06 \text{ Torr}) \quad (2)$$

For a vacuum chamber that is pumping down under atmospheric conditions, the chamber will pump down starting with mostly air. The evacuation will continue until VQI≥1. As the air is pumped out, water will become the main component in the chamber. The VQI at the beginning of chamber evacuation is close to zero, because the ratio of $H_2O$/Air is a small number. As the chamber is evacuated, the VQI increases, but as long as the total pressure remains above 1E-06 Torr, the VQI<1 unless the $H_2O$/Air>1.6, which is unlikely in a vacuum chamber where water is probably fairly constant at the beginning of evacuation while air is the main component being evacuated. When the total pressure reaches 1E-06 Torr, as shown in Eq. 2, the VQI increases by 0.5, and therefore the $H_2O$/Air ratio needed for VQI=1 is $H_2O$/Air=0.8, which converts to water being about 44% of the gas environment, with a total pressure below 1E-06 Torr, which can be an acceptable vacuum environment for some applications.

UHV Baseout

It is well known that a properly pumped down ultra-high vacuum ($10^{-9}$-$10^{-12}$ Torr (UHV)) system will have a residual gas environment made out of 95% hydrogen. UHV users are accustomed to look at residual gas analyzer (RGA) mass spectra and simply evaluate the ratio of Hydrogen to all other components to decide if the vacuum in the UHV system is acceptable, deciding that an experiment can continue as long as the spectrum is clean. A user could employ a gas analyzer according to this invention to control an experiment such that an experiment can continue as long as the ratio of $H_2$ to all other components (integrated) is >0.95. This would be the vacuum quality index in this case. An example of VQI for UHV baseout is:

Step 1) VQI=0 if the pressure is above a target value and hydrogen is less that 25% of the total gas in the spectrum.
Step 2) VQI=% contribution of $H_2$ to the total charge in the mass spectrum over the entire mass range.

The process can start as long as VQI>90. The idea is that the only way the VQI can be 90 is if the system is completely pumped down. Note that this VQI can be made more accurate if the external input 190, shown in FIGS. 1-2, of the temperature of the vacuum chamber is combined into the VQI calculation. The levels of Hydrogen in a UHV chamber are very dependent on external temperature. It is possible to tell if the air conditioning in a room is on or off based on the hydrogen levels in a vacuum chamber. If the user knows how Hydrogen evolution is affected by temperature, then that can be used to normalize the hydrogen levels. In this way, if the system is warm, then the user does not decide that the vacuum chamber is at UHV too soon due to elevated $H_2$ levels caused by temperature. This criteria of quality only requires a total pressure measurement and ratiometric mass spectral data, optionally combined with a room temperature input.

Baseout with Hydrocarbons

Another criteria of quality of a baseout could be a clean vacuum chamber without hydrocarbon contamination. An example case from a manufacturing application: When a new ART MS trap is built, it is expected that the sequence of events during pumpdown of the trap is: 1) initially the trap is mostly filled with air. The air goes out and then the spectrum is dominated by water. It is expected that the total pressure will drop below 1E-8 Torr within 3 hours, and as that level is reached, it is expected that the spectrum will consist of at least 80% water. If a pressure of 1E-8 Torr is reached and the spectrum consists of 80% water, then the ART MS trap will be acceptable since the water will go away and the oils (i.e., hydrocarbons) constitute a contribution in the $10^{-9}$ Torr range (i.e., sufficiently low). If the pressure is not yet at 1E-8 Torr, then the user waits for 3 hours to see if the water peak becomes dominant in the spectrum. If after three hours the trap is not pumped down to 1E-8 Torr and water never becomes 80% of the spectra, then the criteria of quality is not met. In this case, the VQI script can be:

The script is launched by a signal that the pumpdown has started. The external input is the position of the main gate valve indicating the trap is exposed to the cryopump. Once the VQI is calculated as described below, a VQI=1 indicates that the pumpdown was successful.

If pressure >1E-8 Torr and pumpdown time <3 hours, then the VQI=0.5

If pressure >1E-8 Torr and pump down time >3 hours, then the VQI=0 for the rest of the test, and the trap has failed the pumpdown test. The ART MS trap is not acceptable. A bakeout or plasma cleaning of the trap is required. The script stops executing until the next pumpdown.

Once pressure is <1E-8, calculate the fractional contribution of water to the mass spectrum.

If water fractional contribution is less than 0.8 and pumpdown time is less than 3 hours, then report the fractional contribution of water as the VQI.

If water fractional contribution is <0.8 and the pumpdown time is longer than 3 hours, then the VQI=0 for the rest of the test. The ART MS trap fails. The script stops executing until the next pumpdown.

If water fractional contribution reaches 0.8 before 3 hours are elapsed, then the VQI=1. The ART MS trap passes. The VQI is not updated until the next pumpdown. After 3 hours an operator can determine whether a VQI of zero or one is reported. This is an example of a binary VQI, pass (1) or fail (0).

Calculation of the contribution of water to the spectra in this case involves calculating the percentage of charge that the 17 amu and 18 amu peaks contribute to the total charge ejected from the trap during a scan.

P-Comp

Figure 4:
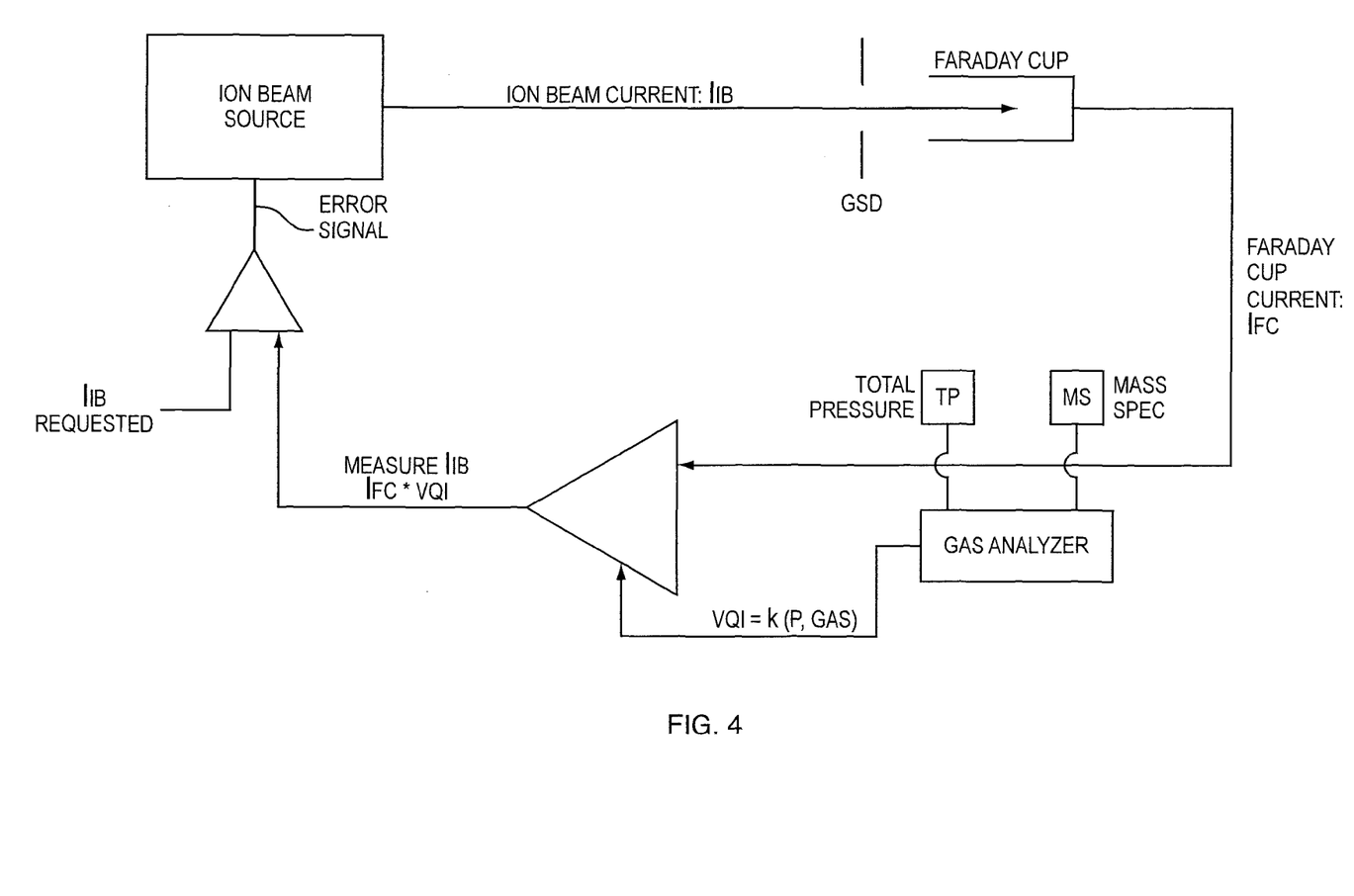
FIG. 4 is a schematic illustration of employing a vacuum quality index of this invention for pressure compensation in a high energy ion implantation process.

There is a large installed base of ion implanters that uses pressure compensation (P-COMP) to control ion beam flux and chemical dose into wafers. The reason to use P-COMP is to compensate against dose monitoring inaccuracies that occur due to beam charge state changes caused by charge exchange between ions in the beam and neutral gas species in the vacuum chamber. See U.S. Pat. No. 7,057,191 to Hsu et al. The present approach is to correct the observed current signal at the Faraday cup (FC) in response to changes in pressure to get the actual current in the ion beam. As the pressure changes, it affects the charge changes that occur in the ion beam travelling to the FC. There should be more change as the pressure increases and more charge exchange takes place. The correction factor is defined through a calibration procedure and works quite well based on total pressure alone as long as the chemical composition of the gas environment does not change. If the pressure is the same but the chemical composition changes, then dramatic shifts in the beam charge state changes can be expected. If one knew not only the total pressure but also the chemical composition, then one could calculate a correction factor for the ion current measured with the FC ($I_{FC}$) that would be independent of chemical changes. The scenario is described in the diagram shown in FIG. 4 that illustrates using the combination of a total pressure (TP) gauge and an ART MS to derive factors used to correlate FC current to ion beam ($I_{IB}$) current:

$$VQI = k(TP, \text{gas composition}) \qquad (3)$$

$$I_{FC} = I_{IB} \times k(TP, \text{gas composition}) \qquad (4)$$

The current reported by the FC, $I_{FC}$, is different from the current dosing the wafer, $I_{IB}$. The correction factor, VQI, is a function of total pressure, TP, and gas composition. The actual calculation of VQI depends on calibration. However, it is also possible that the VQI can be approximated for different gases based on understanding of electron affinities and ionization efficiencies of different species. Once the calibration is done once, then a user can do P-COMP independent of gas composition.

Leak Detection of Specific Chemical Species

In the detection of $SF_6$ in high energy ion implanters, a user can monitor for leaks of $SF_6$ which shows up in a variety of peaks between 19 and 128 amu. See U.S. Pat. No. 6,286,362 to Coffman et al., for a description of leak detection of specific chemical species. $SF_6$ is used to fill the high voltage boxes to avoid arcs developing at the 100 KV potentials that are present in high energy ion implanters. In this case, the gas environment is analyzed at the beam line. The first criteria of quality is that the total pressure must drop below a target value while the ion implanting process is not running. Once the pressure drops below the requested value, then the second criteria of quality is that the contribution of $SF_6$ to the total pressure is expected to be below 1%. For example: a target total pressure (TP) might be 2E-7 Torr before the process starts with less than 1% of $SF_6$. An example VQI in this case is as follows:

Step 1) VQI=2 if TP>2E-7 Torr
Step 2) VQI=% contribution of charge from the $SF_6$ peaks to the total charge in the mass spectrum.

The process can run as long as VQI≤1.

In this case the VQI is >1 as long as the target base pressure is not reached and then it turns into the percentage of $SF_6$ in the spectra, which is desired to keep below 1%.

If the pressure goes above the target TP, or the % $SF_6$ goes above 1%, then the process stops. An external input can optionally be included that would monitor mass flow of $SF_6$ into the high voltage box. If $SF_6$ is not present in the gas box, perhaps because the ion implanting process is operating at lower voltages that do not require it, then the VQI value can be set below 1, so that $SF_6$ detection is not carried out as there might not be any risk at that time.

In another leak detection application, it is not unusual to have a problem in a vacuum chamber where the pressure will not reach a desired base level. In most cases, the user waits until the pressure levels off to do a mass analysis and determine that air is the only remaining gas in the system. It is possible to expedite this process by looking at the ratio of air to the total pressure in the system. For a properly sealed system, a VQI calculated from the ratio of air concentration to all other gas concentrations should not exceed a certain maximum level. For example, if half way through the pumpdown it is already known that air represents half of the gas mixture, then one does not need to wait any longer. This VQI does not require absolute partial pressure information, in fact it can be done using ratiometric concentrations.

Vacuum Quality Monitor for Gas Flow Control

The examples above are demonstrations of how a mass spectrometer could be used as a vacuum quality monitor (VQM), and demonstrations of how a single number could be used to represent the quality of a vacuum system to take the next step in a process. Vacuum quality indexes can be used to decide when to start, continue or stop a process. VQIs can also be passed forward or backward to provide feed forward or feed backward information. VQI's can also include auxiliary data and also other VQIs.

Figure 5:
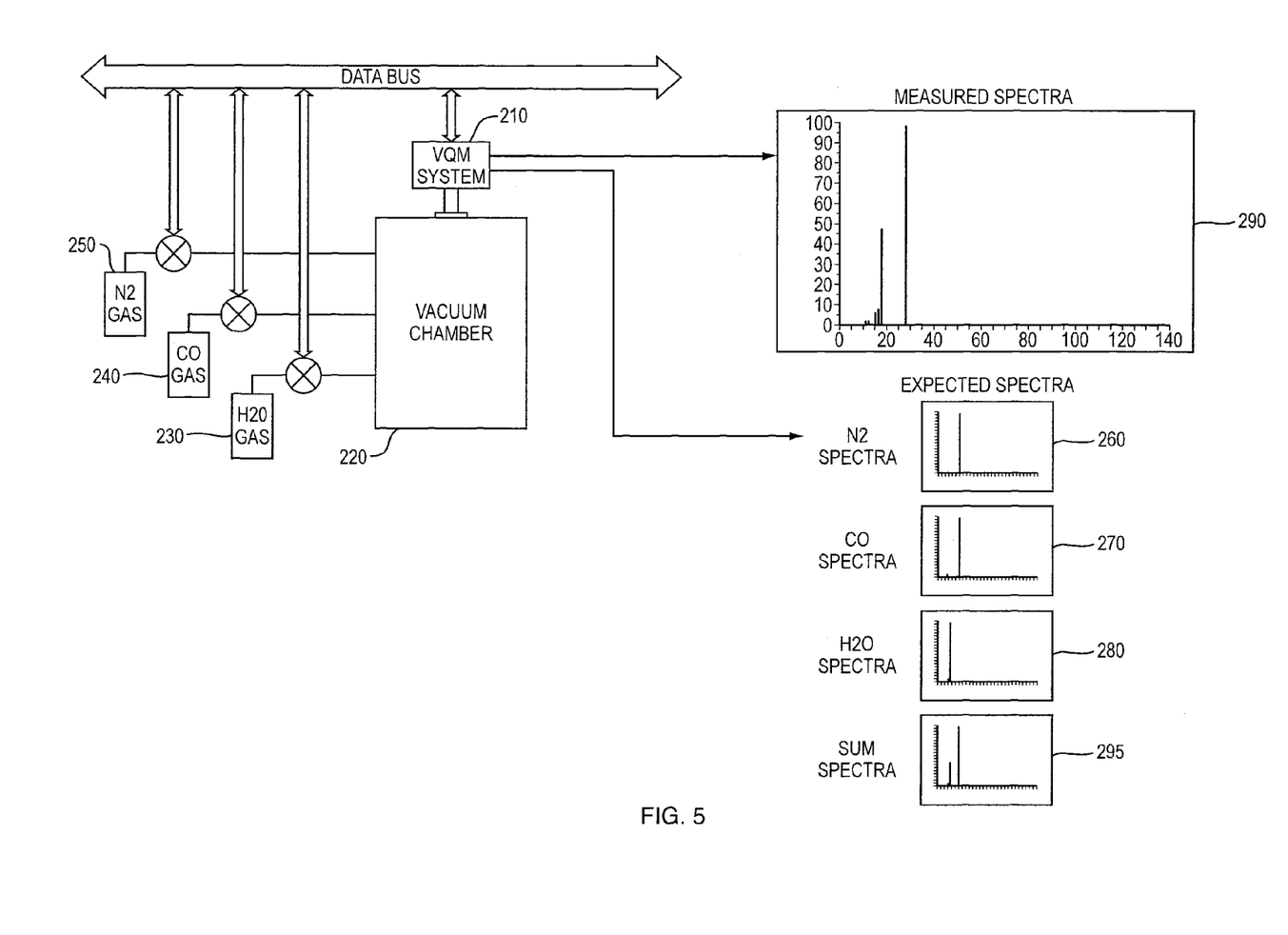
FIG. 5 is a schematic illustration of employing a vacuum quality monitor of this invention to control the flow of gases into a vacuum chamber.

In another embodiment, shown in FIG. 5, a vacuum quality monitor system 210 is attached to the vacuum chamber 220 physically close to the process point of interest. A desired "recipe" (e.g., $N_2$, CO, $H_2O$) of gases 230, 240, and 250 is downloaded into the VQM system 210. The VQM system 210 generates an expected mass spectrometer scan output ($N_2$ spectra 260, CO spectra 270, and $H_2O$ spectra 280) based upon the gas composition of the recipe and the known characteristics of the VQM sensor output (spectra library based upon ionization method, sensor spectral response, system and instrumentation noise, and other factors). The VQM system 210 then controls gas flow based upon closed-loop control of the fit (or correlation) between measured mass spectral 290 and combined expected spectra 295. The measured mass spectral data 290 and expected spectra 260, 270, and 280 can be processed into gas specific parts to provide control of individual gas flows. The VQM system output can directly control the gas flow valves or provide information to the gas flow control system.

In yet another embodiment, the vacuum quality index (VQI) includes an ongoing measurement of the expected spectra and the measured spectra. The complex fit of the spectra of a mixture of gases can be reduced to a single VQI value and used for process monitoring and control.

One of several "goodness of fit" methods can be used. In this application the general use of the "correlation" method is used as a representative method to determine the "goodness of fit" between two complex functions.

Given two arrays M(s) and N(s), where "s" can represent mass, time, index or some other variable, where $$corr(M, N) = \frac{\sum ((M(s) - \overline{M})(N(s) - \overline{N}))}{\sqrt{\sum (M(s) - \overline{M})^2 \sum (N(s) - \overline{N})^2}} \quad (5)$$

corr(M,N)=1 for perfect correlation;
corr(M,N)=0 for no correlation;
corr(M,N)=−1 for negative correlation.

Where gas compositions are unknown, then the VQM system behaves like other mass spectrometers to provide gas spectra without the correlation against a known gas.

The VQI can also be used for contaminants, where the expected measurement of one or more contaminants can be pre-loaded into the VQM system for monitoring. A high correlation (VQI value) could be used to indicate the presence of the contaminant(s) and action can be taken.

Examples of correlation functions available for the vacuum quality index (VQI) are:
VQI $N_2$=corr(M(s),$N_2$(s))
VQI CO=corr(M(s), CO(s))
VQI $H_2O$=corr(M(s),$H_2O$(s))
VQI=corr(M(s), Sum(s))

M(s) may be enhanced by subtracting expected other gases to increase resolution.

X(s)=M(s)−CO(s)−$H_2O$(s), when controlling $N_2$ gas flow
Y(s)=M(s)−$N_2$(s)−$H_2O$(s), when controlling CO gas flow
Z(s)=M(s)−CO(s)−$N_2$(s), when controlling for $H_2O$ gas flow.

Then the $N_2$ gas flow signal is controlled by:
VQI $N_2$'=α*corr(X(s),$N_2$(s))
where a is a function necessary to normalize VQI $N_2$'.
For example, VQI $N_2$'=1 when the proper flow is reached.
Then the CO gas flow signal is controlled by:
VQI CO'=β*corr(Y(s),CO(s))
where β is a function necessary to normalize VQI CO'.
Then the $H_2O$ gas flow signal is controlled by:
VQI $H_2O$'=γ*corr(Z(s),$H_2O$(s))
where γ is a function necessary to normalize VQI $H_2O$'.

The unique properties of speed and data processing capabilities of the VQM system allow the expected gas components to be interactively programmed into the VQM system depending upon the planned recipe of gases. The VQM system has a function that allows generating the expected spectra based upon the planned recipe of gases, and then performing the necessary correlation functions against the recipe and controlling the individual gas flows based upon the correlation results.

The instrument requirements are:
1) fast spectra measurement and data processing/data reduction;
2) a function for generating expected spectra, including a library of spectra and a modeling capability that matches gauge performance;

2a) with a sufficiently fast network, a larger library of gases may be available through fetching from a centrally stored location;

3) the ability to provide complex correlation processing, or similar processing that can be used to provide a closed-loop control system;

4) the gases are compatible with the spectral measuring capabilities of the instrument (mass, optical or other spectra measurement).

The relevant teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A gas analyzer for a vacuum chamber comprising processing electronics configured to:
   a) receive mass spectral data;
   b) receive input of total pressure in the vacuum chamber;
   c) receive external input from at least one sensor; and
   d) employ the mass spectral data, the total pressure in the vacuum chamber, and the external input from the at least one sensor to calculate a vacuum quality index based on at least one criteria of quality.

2. The gas analyzer of claim 1, wherein the processing electronics are further configured to determine an identity of at least one chemical species present in the vacuum chamber based on the mass spectral data.

3. The gas analyzer of claim 2, wherein the processing electronics are further configured to determine fullness level of a cryopump having at least a first stage and a second stage.

4. The gas analyzer of claim 3, wherein the at least one sensor includes a temperature sensor of the temperature of the second stage of the cryopump, at least one chemical species present in the vacuum chamber is hydrogen, and the at least one criteria of quality includes a ratio of hydrogen partial pressure to the total pressure in the vacuum chamber.

5. The gas analyzer of claim 2, wherein the processing electronics are further configured to determine relative concentrations of at least two chemical species present in the vacuum chamber, and to employ the relative concentrations to calculate the vacuum quality index.

6. The gas analyzer of claim 2, wherein the processing electronics are further configured to determine partial pressure of the at least one chemical species present in the vacuum chamber, and to employ the partial pressure to calculate the vacuum quality index.

7. The gas analyzer of claim 6, wherein the processing electronics are further configured to determine the partial pressure of at least two chemical species present in the vacuum chamber, and to employ the partial pressure of the at least two chemical species to calculate the vacuum quality index.

8. The gas analyzer of claim 6, further including a display of the partial pressure of the at least one chemical species.

9. The gas analyzer of claim 6, further including a display of minimum and maximum partial pressures of the at least one chemical species.

10. The gas analyzer of claim 6, further including a digital output of the partial pressure of the at least one chemical species.

11. The gas analyzer of claim 1, wherein the at least one sensor includes a substrate temperature sensor.

12. The gas analyzer of claim 1, wherein the at least one sensor includes a vacuum pump speed sensor.

13. The gas analyzer of claim 1, wherein the at least one sensor includes a cryopump temperature sensor.

14. The gas analyzer of claim 1, wherein the vacuum quality index controls a binary output.

15. The gas analyzer of claim 1, wherein the processing electronics are further configured to employ the vacuum quality index to control a process.

16. The gas analyzer of claim 15, wherein the process is baseout of the vacuum chamber and the at least one sensor includes a temperature sensor of the temperature of the vacuum chamber.

17. The gas analyzer of claim 16, wherein the at least one criteria of quality includes a ratio of hydrogen to all other chemical species in the vacuum chamber.

18. The gas analyzer of claim 15, wherein the process is baseout of the vacuum chamber and the at least one sensor includes a position sensor of a gate valve between the vacuum chamber and a vacuum pump for evacuating the vacuum chamber.

19. The gas analyzer of claim 18, wherein the at least one criteria of quality includes a ratio of water to all other chemical species in the vacuum chamber.

20. The gas analyzer of claim 1, further including a display of at least one of the vacuum quality index, the total pressure in the vacuum chamber, and a scan range of the mass spectral data.

21. The gas analyzer of claim 1, further including a digital output of at least one of the vacuum quality index and the mass spectral data.

22. The gas analyzer of claim 1, wherein the at least one criteria of quality is user-programmable.

23. The gas analyzer of claim 1, further including a mass spectrometer configured to provide the mass spectral data.

24. A method of analyzing gas in a vacuum chamber comprising:
   a) receiving mass spectral data;
   b) receiving input of total pressure in the vacuum chamber;
   c) receiving external input from at least one sensor; and
   d) employing the mass spectral data, total pressure in the vacuum chamber, and the external input from the at least one sensor to calculate a vacuum quality index based on at least one criteria of quality.

25. The method of claim 24, further including determining an identity of at least one chemical species present in the vacuum chamber based on the mass spectral data.

26. The method of claim 25, further including determining fullness level of a cryopump having at least a first stage and a second stage.

27. The method of claim 26, wherein the at least one sensor includes a temperature sensor of the temperature of the second stage of the cryopump, at least one chemical species present in the vacuum chamber is hydrogen, and the at least one criteria of quality includes a ratio of hydrogen partial pressure to the total pressure in the vacuum chamber.

28. The method of claim 25, further including determining relative concentrations of at least two chemical species present in the vacuum chamber, and employing the relative concentrations to calculate the vacuum quality index.

29. The method of claim 26, further including determining partial pressure of the at least one chemical species present in the vacuum chamber, and employing the partial pressure to calculate the vacuum quality index.

30. The method of claim 29, further including outputting a digital output of the partial pressure of the at least one chemical species.

31. The method of claim 24, wherein the at least one sensor includes at least one of a substrate temperature sensor, a vacuum pump speed sensor, and a cryopump temperature sensor.

32. The method of claim 24, further including employing the vacuum quality index to control at least one of a binary output and an analog output.

33. The method of claim 24, further including employing the vacuum quality index to control a process.

34. The method of claim 33, wherein the process is baseout of the vacuum chamber and the at least one sensor includes a position sensor of a gate valve between the vacuum chamber and a vacuum pump for evacuating the vacuum chamber.

35. The method of claim 34, wherein the at least one criteria of quality includes a ratio of water to all other chemical species in the vacuum chamber.

36. The method of claim 33, wherein controlling the process includes feed forward process control.

37. The method of claim 33, wherein controlling the process includes feed backward process control.

38. The method of claim 33, wherein controlling the process includes matching the quality of the process in different vacuum chambers.

39. The method of claim 24, further including outputting a digital output of the vacuum quality index.

40. A method of analyzing gas in a vacuum chamber comprising:
   a) receiving mass spectral data;
   b) receiving input of total pressure in the vacuum chamber; and
   c) employing the mass spectral data and total pressure in the vacuum chamber to calculate a vacuum quality index based on at least one criteria of quality.

41. A method of analyzing gas in a vacuum chamber comprising:
   a) receiving mass spectral data;
   b) receiving input of total pressure in the vacuum chamber;
   c) receiving external input from an ion beam current sensor;
   d) employing the mass spectral data, total pressure in the vacuum chamber, and the external input from the ion beam current sensor to calculate a vacuum quality index based on at least one criteria of quality; and
   e) employing the vacuum quality index to control a process of ion implantation with an ion beam.

42. The method of claim 41, wherein the at least one criteria of quality includes a compensation due to beam charge state changes caused by charge exchange between ions in the ion beam and neutral gas species in the vacuum chamber.

43. A gas analysis system for a vacuum chamber comprising:
   i) a mass spectrometer;
   ii) at least one sensor; and
   iii) a gas analyzer comprising processing electronics configured to:
      a) receive mass spectral data;
      b) receive input of total pressure in the vacuum chamber;
      c) receive external input from the at least one sensor; and
      d) employ the mass spectral data, the total pressure in the vacuum chamber, and the external input from the at least one sensor to calculate a vacuum quality index based on at least one criteria of quality.

* * * * *